Sept. 1, 1925.

J. A. SMITH

PUMPING APPARATUS

Filed Oct. 3, 1923

Inventor
Jasper A. Smith
By J. Ralph Fehr
His Attorney

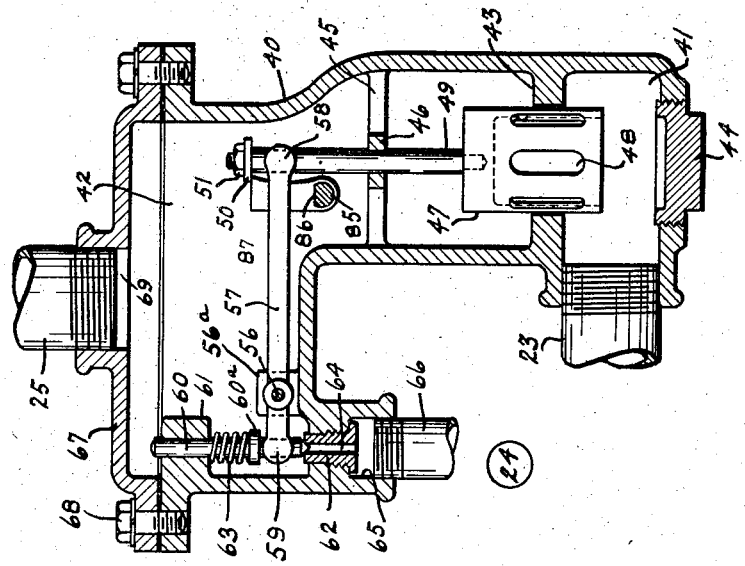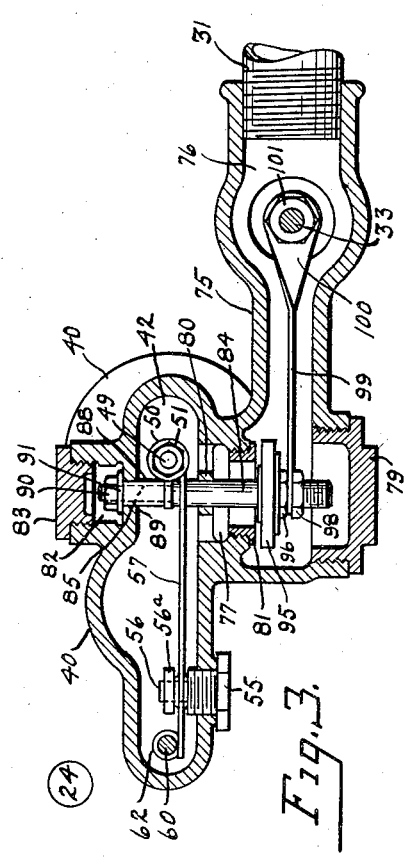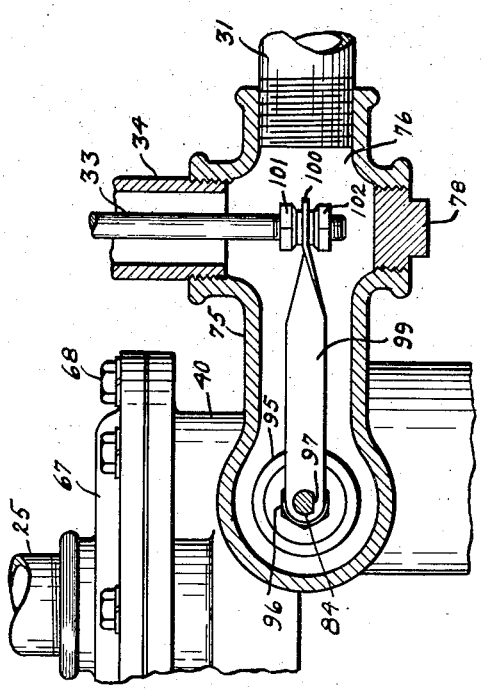

Sept. 1, 1925.  1,552,088
J. A. SMITH
PUMPING APPARATUS
Filed Oct. 3, 1923   3 Sheets-Sheet 3

Inventor
Jasper A. Smith
By J Ralph Fehr
His Attorney

Patented Sept. 1, 1925.

1,552,088

UNITED STATES PATENT OFFICE.

JASPER A. SMITH, OF DAYTON, OHIO, ASSIGNOR TO DELCO-LIGHT COMPANY, OF DAYTON, OHIO, A CORPORATION OF DELAWARE.

PUMPING APPARATUS.

Application filed October 3, 1923. Serial No. 666,286.

*To all whom it may concern:*

Be it known that I, JASPER A. SMITH, a citizen of the United States of America, residing at Dayton, county of Montgomery, State of Ohio, have invented certain new and useful Improvements in Pumping Apparatus, of which the following is a full, clear, and exact description.

This invention relates to pumping apparatus including a pressure storage tank in which a quantity of air is accumulated along with the water in order that a quantity of water may be stored under air pressure.

The object of the present invention is to compensate for the need of air in the pressure tank.

The above object is carried out by providing an auxiliary tank or air accumulator which may be vented and drained while the flow of water from the pump to the pressure tank ceases, and the flow of water from the pump to pressure tank will cause the drain to be automatically closed, so that the air accumulated in the auxiliary tank will be carried over into the pressure tank. The draining of the tank can be controlled automatically in response to the need for air in the storage tank, so that the air accumulator will not be drained each time the flow of water to the storage tank ceases, but will be drained as the need for air in the storage tank is present. If desired, the draining of the air accumulator can be controlled manually.

Other and further objects and advantages of the present invention will be apparent from the following description, reference being had to the accompanying drawings, wherein a preferred embodiment of the present invention is clearly shown.

In the drawings:

Fig. 3 is a sectional view thereof taken on the line 3—3 of Fig. 2;

Fig. 4 is a sectional view thereof taken on the line 4—4 of Fig. 2;

Fig. 5 is a sectional view thereof taken on the line 5—5 of Fig. 2;

Figures 1, 2:
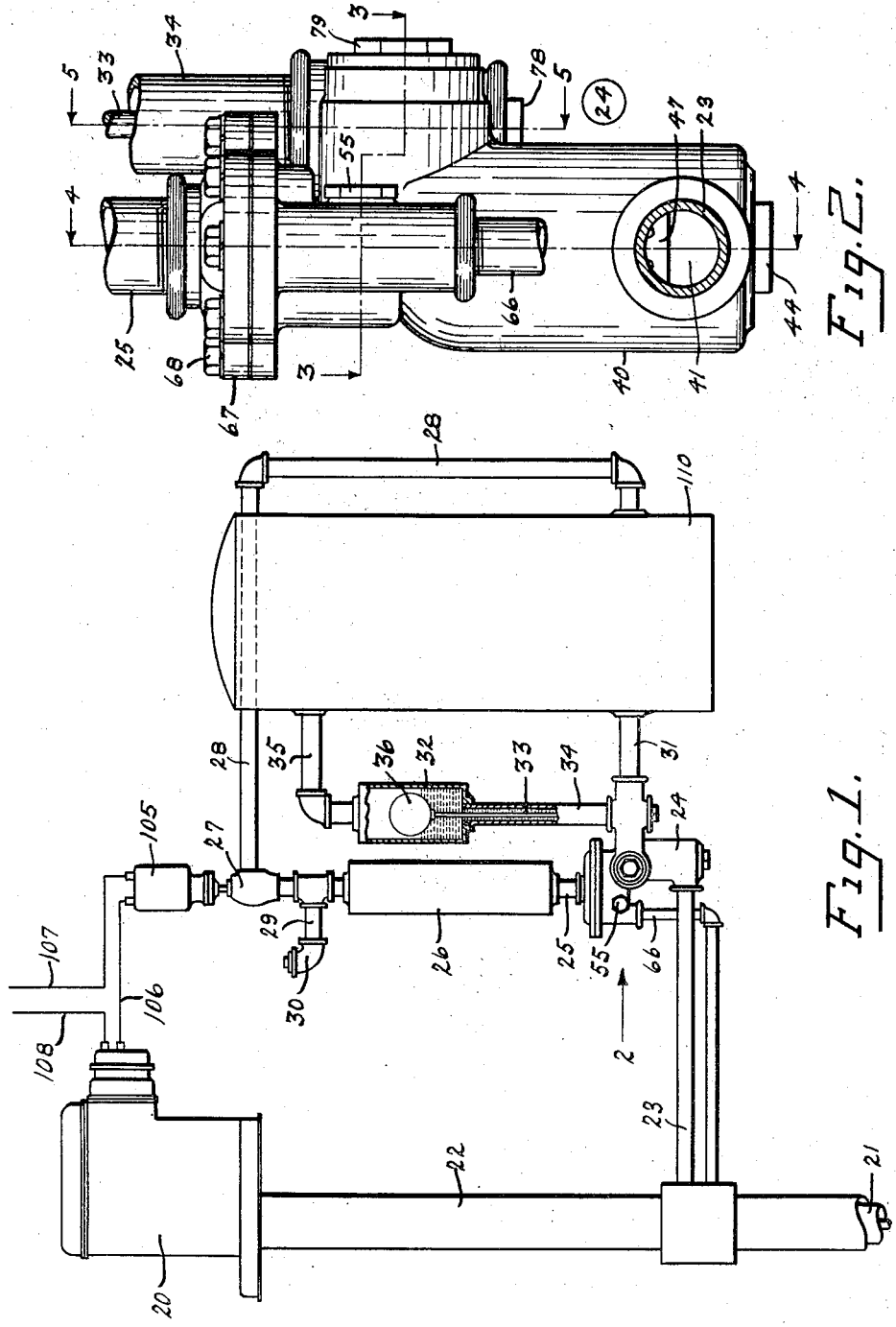
Fig. 1 is a diagrammatic view of a preferred form of pumping system including the present invention.
Fig. 2 is a view in elevation of the controlling mechanism, looking in the direction of the arrow 2 in Fig. 1.

Referring to the drawings, a pump driving mechanism or power head 20 operates a pump 21 projecting into a suitable source of supply such as a well and supported within a well casing 22 having a discharge outlet pipe 23. The pipe 23 is connected with a controlling device 24 which is connected by a pipe 25 with a hollow cylinder or air accumulator 26. The water and air outlet connection between the air accumulator 26 and a storage tank 110 is provided by check valve 27 and piping 28. Connected with the piping 29 between the air accumulator 26 and check valve 27 is a check valve 30 for admitting air to the accumulator 26, and for preventing discharge of water through the air inlet. Tank 110 is connected with a water distribution system not shown. Controlling device 24 is connected with tank 110 by a pipe 31, and is also connected with a float chamber 32 by a pipe 34, and chamber 32 is connected with tank 110 by piping 35. Rod 33 supports a float ball 36 within the float chamber 32.

Mounted upon the check valve 27 is a pressure controlled switch 105, responsive to certain predetermined high and low pressures in the tank 110 for controlling the operation of the power head 20. Wire 106 leads from the switch 105 to the pumping mechanism, the switch 105 and pumping mechanism 20 being connected with a suitable source of current through wires 107 and 108, respectively.

The controlling device 24 comprises a valve body 40 divided into lower and upper chambers 41 and 42, respectively, by a wall 43. Chamber 41 is provided with a tapped opening for receiving the threaded end of discharge pipe 23, and is also provided with a removable plug 44 in the bottom wall thereof. A spider 45, preferably cast integrally with the walls of valve body 40, supports a guide bearing 46 within the chamber 42. Wall 43 is provided with a central aperture for receiving a cylindrical valve 47, controlled by the flow of water and having ports 48. A valve rod 49 is secured to valve 47 and is adapted to reciprocate through guide bearing 46. A lug or washer 50 and a nut 51 are secured to the upper end of valve rod 49. A removable plug 55 which engages a wall of valve body 40 (see Fig. 3) and extends into the chamber 42, supports a pivot 56 for a lever 57 held thereon by a nut 56ª. Lever 56 includes ends 58 and 59 which cooperate with valve rod 49 and valve 60, respectively.

Valve 60 slidably passes through an inwardly extending lug 61 and is normally resiliently maintained by a coil spring 63 upon the removable valve seat 62 supported by valve body 40. Spring 63 surrounds valve 60 and bears against a collar 64 secured to valve 60 and against the lower surface of flange 61. Valve seat 62 is provided with a passage 64, leading from chamber 42 into the recessed portion 65, which portion is tapped for receiving the threaded end of drain pipe 66 which leads to the source of supply or to a drain. A closure for chamber 42 is provided by cover 67 which is secured to valve body 40 by bolts 68 and which is provided with a tapped opening 69 for receiving pipe 25.

Valve body 40 is provided with an elongated portion 75 comprising a chamber 76 having communication with chamber 42 through passage 77. Portion 75 is provided with removable plugs 78 and 79 and with tapped openings for receiving pipes 31 and 34, as shown in Fig. 5. A bearing 80 and a removable valve seat 81 are carried by the valve body 40 between chambers 42 and 76. Valve body 40 is recessed at 82 and is tapped to receive a removable plug 83. A shaft 84, disposed at right angles to the axis of the valve rod 49, is slidably mounted in bearing 80, and one end thereof extends into the chamber 76. The other end of shaft 84 is provided with a reduced portion 85 and is provided with a flat 86 (see Fig. 4) which serves to secure a stop 87 thereon. Stop 87 is adapted to be moved into the path of travel and engage washer 50 for limiting the downward movement of rod 49 and valve 47 under certain conditions to be described. A sleeve 88 fits over the reduced portion 85 and is slidable through the wall 89 of valve body 40. A nut 90 engaging the threaded end of shaft 84 bears against a washer 91, thereby forcing sleeve 88 into engagement with the stop 87 and holding stop 87 in position on reduced portion 85, for engagement with washer 50. A valve 95, adapted to engage valve seat 91, is slidably mounted on shaft 84 within the chamber 76. The shaft 84 is provided with a threaded portion 97 which is flat on one side and cooperates with nuts 96 and 98 to secure to shaft 84 a connecting arm 99. Arm 99 is provided with an end portion 100 which is in a plane at right angles to the plane of arm 99. This portion 100 is secured to flat rod 33 by nuts 101 and 102 which permit of adjustment of the rod 33 with respect to arm 99.

It will be apparent that upon downward movement of the rod 33, the shaft 84 will be rotated in a clockwise direction, and upon upward movement of rod 33, the shaft 84 will be rotated in a counterclockwise direction.

The operation of the invention is as follows: Assume that the amount of air in the tank 110 is sufficient for the needs of the pressure storage system. Under these conditions and when the power head has been rendered inoperative by the pressure control switch 105, the water level in tank 110 will be at or below a certain predetermined level such that the float 36 will be in a position causing the stop 87 in Fig. 4 to engage the washer 50 as shown in this figure. Consequently the flow of water from the pump 21 to the tank 110 will cause the flow controlled valve 47 to be elevated above the position shown in Fig. 4. When this flow ceases, the valve 47 will return to the position shown in Fig. 4. Therefore the valve 60 is permitted to remain closed through the action of the spring 63. However, when there is need for air in the tank 110 in order to maintain the amount of air cushion for the proper functioning of the pressure system, the air charging apparatus will be rendered operative in the following manner. Lack of sufficient air in the tank 110 will allow the level of water in tank 110 to rise above a certain predetermined level, and therefore the level of water in the float tank 32 will rise causing the float 36 to be elevated and to cause the stop 87 to be rotated counterclockwise as viewed in Fig. 4. Therefore, the valve 47 will drop by gravity and cause the washer 50 to engage the end 58 of lever 57 thereby causing the lever end 59 to engage shoulder 64 and cause valve 60 to be lifted from its seat 62. This operation will cause the air accumulator 26 to be drained, air from the outside entering through the check valve 30 and pipe 29. Due to the action of check valves 27 and 95 (see Fig. 3) water cannot flow back from the tank 110 into the air accumulator 26 and controller 24. When the power head 20 is caused to be operated again due to the fall of pressure in the tank 110, the flow of water from the pump 21 to the tank 110 will cause the valve 47 to be lifted permitting the valve 62 to close. Water will be pumped past the valve 95, (see Fig. 3) through the passage 76 in pipe 31 into the tank 110. Water will also flow from the controller 24 through pipe 25 into the air accumulator 26 causing the air in said accumulator to pass through the check valve and pipe 28 into the tank 110. When the pressure in tank 110 has been built up to such a value as to cause the power head 20 to stop through the agency of the switch 105, water will cease to flow through the tank 110 from the pump 21, therefore, the flow controlled valve 47 will drop down by gravity. If the water level in the tank 110 is at this time above a certain level so that more air is needed in the tank, the stop 87 will still be maintained out of the path of movement of the washer 50. Therefore the valve 47 will be permitted to open the valve 60 to drain the accumulator. Then when the pump operation starts again, more air will be added to the air already in the tank 110. This cycle of operation will be repeated until sufficient air has been stored in the tank 110 to cause the water therein to be maintained at or below a certain level when the pumping operation ceases. Then the stop 87 will be restored to the position shown in Fig. 4, thereby preventing the fall of the valve 47 and the engagement of the washer 50 with the lever 57. Consequently, the accumulator will not be drained again until the need for air in tank 110 arises.

Figure 7:
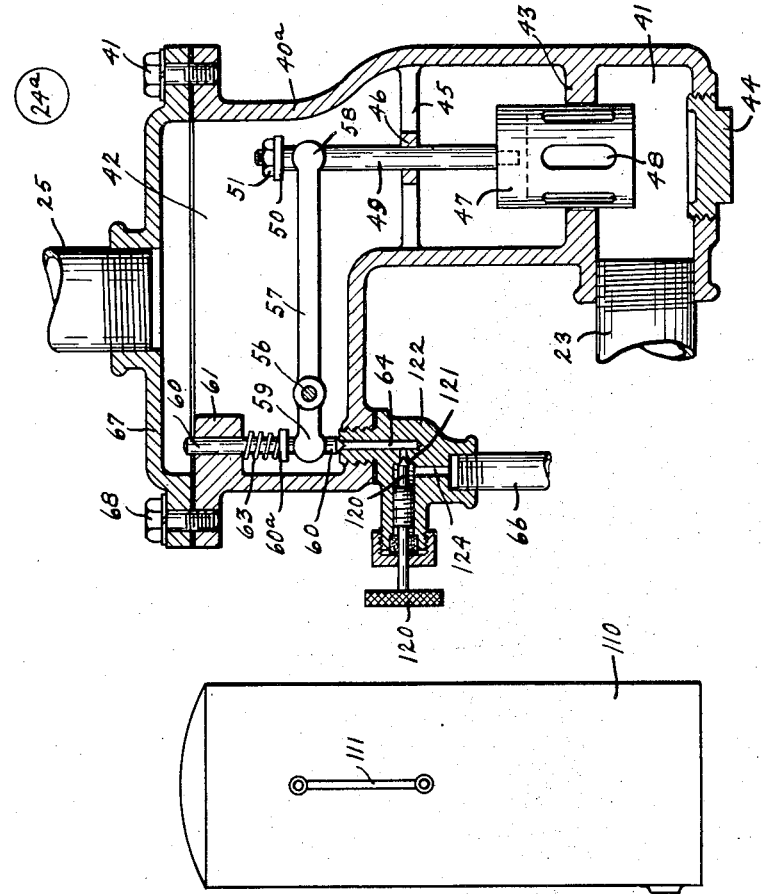
Fig. 7 is a vertical sectional view of the controller 24ª shown in Fig. 6.
Figure 6:
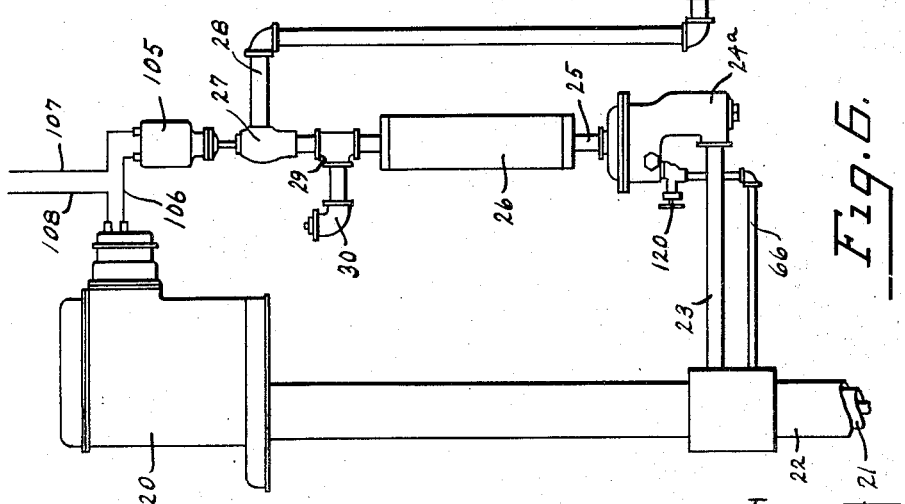
Fig. 6 is a diagrammatic view of a modified form of the present invention including the manual control.

In the form of the invention shown in Figs. 1 to 5, the supplying of air to the tank 110 is controlled automatically by the need of air in the storage tank. In the form of invention shown in Figs. 6 and 7 this automatic control is supplanted by a manual control to provide apparatus which requires more attention on the part of the operator but has the advantage of low cost. In Figs. 6 and 7, the parts which are identical with parts shown in Figs. 1 to 5 have been given the same reference numerals and the parts which perform the same function which are not identical have been given the same reference numeral with the affix "a". It will be noted from Fig. 7, that the automatic control of the valve 47 has been omitted so that each time water is forced from the pump 21 to the tank 110 the valve 60 will be allowed to close, and each time the water ceases to flow from the passage 41 to the passage 42 the valve 47 will drop down and cause the valve 60 to open. In order to prevent the addition of air to the tank 110 each time the pump operates the draining of the air accumulator 26 is prevented by means of a manually controlled valve 120 cooperating with a seat 121 provided in a valve body 112. The closing of valve 120 prevents communication between passages 64 and 124 and valve body 122, thereby cutting off communication between the drain pipe 66 and the chamber 42 of controller 24ª. In this form of apparatus the need for air in the tank 110 is determined by looking at the water level in the sight glass 101. When this level is above a certain mark the operator will open the valve 120 to permit the addition of air to the tank 110. Then when the level of the water in tank 110 is below a certain point at the time the pump ceases operation to store water under pressure in tank 110, the operator will close the valve 120 to prevent further draining of the air accumulator 26.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What is claimed is as follows:

1. A water system comprising, in combination, a pump, a pressure storage tank, an air accumulator connected with the pump and tank, means responsive to water level in the tank for causing the accumulator to be drained, and means responsive to flow of water into the tank for closing said drain whereby pressure in the system will carry the air in the accumulator into the tank.

2. A water system comprising, in combination, a pump, a pressure storage tank, an air accumulator connected with the pump and tank, means responsive to the need for air in the tank for permitting the air accumulator to be drained, and means responsive to flow of water into the tank for closing said drain whereby pressure in the system will carry the air in the accumulator into the tank.

3. A water system comprising, in combination, a pump, a pressure storage tank, an air accumulator connected with the pump and tank, a normally closed drain valve for said accumulator, means responsive to the need for air in the tank for causing said valve to open, and means responsive to the flow of water into the tank for permitting said valve to be closed.

4. A water system comprising, in combination, a pump, a pressure storage tank, an air accumulator connected with the pump and tank, a spring closed drain valve for said accumulator, a member operated by flow of water into the tank permitting said valve to be closed but capable of operation when the flow of water ceases to open said valve, and means responsive to water level in the tank for preventing the operation of said member to open said valve when the water level in said tank has fallen below a predetermined level.

5. A water system comprising, in combination, a pump, a pressure storage tank, an air accumulator connected with the pump and tank, a spring pressed drain valve for said accumulator, a member operated by flow of water into the tank connected with said valve and adapted when the flow of water ceases to counteract the spring pressure and open the drain valve, and means for preventing the operation of the flow controlled member to open the drain valve when the level of water in the tank falls below a certain level.

6. A water system comprising, in combination, a pump, a pressure storage tank, an air accumulator connected with the pump and tank, a spring pressed drain valve for said accumulator, a gravity member connected with said valve and adapted to be lifted by the flow of water into the tank and to return to a certain low position when the flow of water ceases and thereby cause the drain valve to be opened, and a stop located in the path of movement of said gravity member to prevent its return to the lower position when the water level in the tank falls below a certain level.

7. A water system comprising, in combination, a pump, a pressure storage tank, an air accumulator connected with the pump and tank, a spring pressed drain valve for said accumulator, a lever for lifting said valve, a member controlled by the flow of water adapted when the flow of water ceases to engage said lever and open the valve, and means for preventing said engagement when the water level in the tank falls below a certain level.

8. A water system comprising, in combination, a pump, a pressure storage tank, an air accumulator connected with the pump and tank, a spring pressed drain valve for said accumulator, a lever for lifting said valve, a member controlled by the flow of water adapted when the flow of water ceases to return to a certain low position thereby causing the drain valve to be opened, a stop on the flow controlled member, a float controlled member, and a lug adapted to be brought into the path of movement of the stop by said float controlled member when a certain water level in the tank has been reached for preventing the opening of said drain valve.

9. A water system comprising, in combination, a pump, a pressure storage tank, an air accumulator connected with the pump and tank, means for causing the air accumulator to be drained, and means responsive to the flow of water into the tank for closing communication between the drain and the air accumulator.

10. A water system comprising, in combination, a pump, a pressure storage tank, an air accumulator connected with the pump and tank, a normally closed drain valve for said accumulator, and means responsive to the cessation of flow of water into the tank for causing the drain valve to be opened and permitting the drain valve to be closed when water flows from the pump to the tank.

11. A water system comprising, in combination, a pump, a pressure storage tank, an air accumulator connected with the pump and tank, a normally closed drain valve for said accumulator, means responsive to the cessation of flow of water into the tank for causing the drain valve to be opened and permitting the drain valve to be closed when water flows from the pump to the tank, and separate means for controlling the drain.

12. A water system comprising, in combination, a pump, a pressure storage tank, an air accumulator connected with the pump and tank, means responsive to the need of air in the storage tank for causing air to be collected in the accumulator while the pump is idle, and means responsive to the flow of water from the pump through the accumulator to the tank to cause the air therein to be forced into the pressure storage tank.

13. A water system comprising, in combination, a pump, a pressure storage tank, a main duct connecting the pump and tank, and an accumulator in said duct, and means responsive to the need of air in the tank for causing air to be trapped in the accumulator.

In testimony whereof I hereto affix my signature.

JASPER A. SMITH.